June 23, 1970     J. H. FURLONG     3,516,506
CONTROL APPARATUS FOR AUTOMATIC INDUSTRIAL OPERATIONS
Filed Sept. 18, 1967
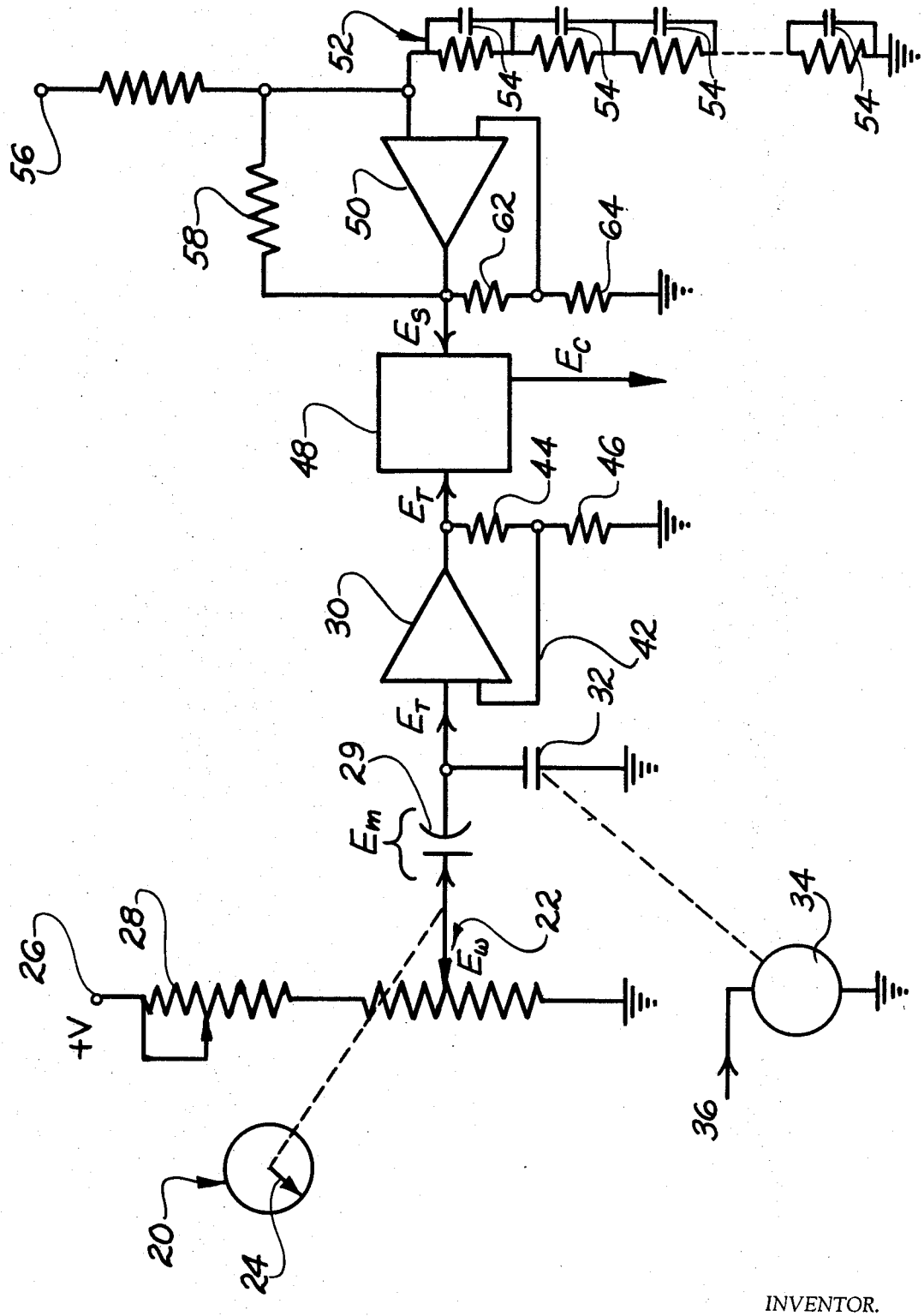
INVENTOR.
JAMES H. FURLONG
BY
Francis J. Kremblas Jr.
ATTORNEY

United States Patent Office 3,516,506
Patented June 23, 1970

3,516,506
CONTROL APPARATUS FOR AUTOMATIC INDUSTRIAL OPERATIONS
James H. Furlong, Columbus, Ohio, assignor to Auto-Control, Inc., Columbus, Ohio, a corporation of New Jersey
Filed Sept. 18, 1967, Ser. No. 668,420
Int. Cl. G01g 23/16, 19/22, 3/14
U.S. Cl. 177—164      3 Claims

ABSTRACT OF THE DISCLOSURE

A control apparatus for automated industrial processes, such as for example, the delivering of material in a batching operation according to a given weight ratio wherein the apparatus would include a weighing scale and a transducer operatively connected thereto which yields an output signal proportional to weight. This output signal is selectively permitted to charge a capacitor such that the capacitor functions as a memory storing device and stores a signal which represents the weight of the actually delivered material. When additional material is added to the scale, the output signal emitted from the transducer, in effect, is continuously decreased by the value of the charge stored in the capacitor. The signal appearing at the output of the capacitor then represents the weight of the material indicated by the scale at any given instant minus the weight of the material at the time the capacitor was charged. The charge is maintained in the capacitor substantially unchanged for relatively long periods of time by the use of an operational amplifier having a high input impedance which is connected in series to the output side of the capacitor. The signal appearing at the output of the amplifier is then compared with a given predetermined signal and a control signal is developed to control some phase of the operation when the signal appearing at the amplifier output and the predetermined signal reach a given ratio.

---

The present invention relates generally to automated industrial operations, such as the controlled delivery of materials into a common vessel according to a given weight ratio and particularly to a novel improved apparatus for weighing and controlling the delivery of these materials.

Prior control apparatus for automatic weigh batching operations, generally included a mechanical scale operatively connected to a transducer which yielded an output signal proportional to weight. This output signal is compared by a conventional comparator element to a predetermined signal referred to in the art as the "set point," which represents a desired value of weight. When the output signal from the transducer equals the predetermined signal, the comparator develops a control signal to control some part of the automatic operations. This control signal usually actuates the delivery mechanism for the particular materials being batched. In practical applications, the flow of materials cannot always be stopped to insure that the actual amount of delivered materials will be precisely equal to the desired amount called for in the batching formula.

Inherent in these prior art control apparatus is the necessity that the predetermined signals or "set points" represent a value equal to the desired accumulated subtotal of the materials progressively added to the batch, since the signals from the transducer which are to be compared with the respective "set point" signals represent all the materials as delivered and weighed.

Therefore, if the actual delivered material is less than or greater than the first set point value, then the probability that the second delivered material will be more than or less than the desired amount is greatly increased. This type of weight interaction seriously affects the batching operation since the most important process parameter is the weight ratio between materials.

In general, the present invention comprises a conventional weighing device and a transducer operatively connected thereto which yields an output signal proportional to weight. This output signal is selectively permitted to charge a capacitor which performs in a novel manner as a memory storing device such that when additional material is added to the scale, the output signal emitted from the transducer, in effect, is continuously decreased by the value of the signal stored in the capacitor. The signal leaving the capacitor then represents the weight of the material being added to the weighing vessel which is the total weight indicated by the scale at any given moment minus the weight indicated by the scale at the time the capacitor was charged.

This signal leaving the capacitor, referred to herein as the "tare signal," is then compared with an appropriate predetermined "set point" signal which represents the actual desired value of weight for the material to be added to the batch. When the "tare signal" is equal to or greater than the predetermined set point signal, a control signal is developed to actuate some other phase of the operation.

It is therefore an object of the present invention to provide an apparatus of the type described which automatically provides for controlling the delivery of each material added to a batch responsive to an electrical signal representing the actual desired value of weight of each material rather than the sum of the weight of the delivered materials.

It is another object of the present invention to provide an apparatus of the type described which permits greater accuracy to be achieved in the weight ratio of multi-ingredient batching operations. This is accomplished by eliminating the effect of deviations from the desired amounts of materials in the batch upon the delivery of the desired amount of any other materials added to the batch.

It is another object of the present invention to provide a control apparatus of the type described which automatically tares the weight of a vessel in applications wherein a given amount of a single component is to be delivered into a plurality of separate vessels.

It is another object of the present invention to provide an apparatus of the type described which may be manufactured and fabricated in an economical manner.

Other objects and advantages of the present invention will be apparent from the following description, reference being had to the accompanying drawings wherein a preferred form of embodiment of the invention is clearly shown.

In the drawings:

The figure is a diagrammatical view of an apparatus for automatically controlling a multi-ingredient weigh batching operation constructed in accordance with the present invention.

Referring in detail to the drawing, a control apparatus constructed in accordance with the present invention is shown in the figure, and for purposes of clarity is illustrated in a simplified form as applied to a weigh batching operation.

A weighing means, in the form of a mechanical scale, indicated generally at 20, is connected to a transducer, indicated generally at 22, in a conventional manner to produce an electrical signal which is proportional to the weight indicated by the scale. Preferably the transducer is in the form of a rotary potentiometer connected to the indicating mechanism 24 of the the scale to yield an output voltage proportional to weight.

However, it should be pointed out that other means may be utilized to produce an output signal in the form of a voltage, current or impedance which are proportional to weight such as, for example, a load cell transducer or a linear differential transformer. Similarly a variety of other forms of weighing means may be used without departing from the spirit of the present invention.

With continued reference to the figure, an input voltage is supplied to terminal 26 and may be adjusted to any convenient value by a variable resistor 28.

A relatively high quality, low leakage capacitor is connected to potentiometer 22 and to a buffer element 30, preferably in the form of an operational amplifier having a very high input impedance quality. The high input impedance of buffer element 30 inhibits the leakage of the charge stored in capacitor 29. It should be pointed out that the efficiency of the performance of the control apparatus of the present invention depends upon the rate of leakage of the charge across the capacitor which is inversely proportional to the value of the input impedance of buffer element 30 and inversely proportional to the size of the capacitor.

In most applications, it is necessary to maintain the charge for at least 8 to 10 seconds in order for each step in the operation to be completed without appreciably varying the stored charge.

However, it is preferable to be able to maintain the charge across the capacitor for approximately one to two hours without appreciable change. Then the apparatus is not only capable of a wider range of applications, but also is more accurate in applications wherein the capacitor need only hold the charge for relatively shorter time periods.

It has been found that an operational amplifier, having an input impedance in the range of one million to ten million megohms, in conjunction with a capacitor of approximately two microfarads, permits the storing of a charge in the capacitor without appreciable leakage for a long enough time period such that any error relative to leakage of the stored charge is negligible, compared to the tolerance limits of the other phases of the operation.

It is important to point out, however, that elements having lower values of input impedance or other sizes of capacitors may be employed without departing from the spirit of the present invention.

When switch 32 is in an open position, the voltage appearing at the input of amplifier 30 is the algebraic sum of the voltage appearing at the output of potentiometer 22 and the voltage charge across capacitor 28.

Capacitor 29 is connected in the circuit such that the voltage charge stored in the capacitor is of opposite polarity to the voltage at the output of potentiometer 22. Thus, in effect, the voltage appearing at the input amplifier 30 is the voltage at the output of potentiometer 22 minus the voltage charge stored in capacitor 29.

A typical feed back path, indicated generally at 42, includes resistive elements 44 and 46 to provide for closed loop operation of amplifier 30.

A conventional comparator element, indicated generally at 48, includes a first input which is connected to the output of amplifier 30 and a second input which is connected to the output of a conventional operational amplifier 50.

A plurality of resistors, indicated generally at 52, are operatively connected to the input of amplifier 50 and to a source of voltage, not illustrated, which is connected to terminal 56. Amplifier 50, in conjunction with resistors 52 provide means to produce a given voltage at the output of amplifier 50.

A plurality of switches 54, which may be controlled by a conventional system programming device, not illustrated, such as an I.B.M. punch card which dictates the opening and closing of the appropriate switches to develop a predetermined set point voltage which represents a desired value of weight.

It should be readily understood that any predetermined set point signal desired may be developed by other circuits and introduced into the second input of comparator 48 without departing from the spirit of the present invention.

Comparator 48 is of such a nature that when the signal from the output of amplifier 30 is equal to or greater than the set point voltage $Es$ from the output amplifier 50, a control voltage $Ec$, is developed which may be utilized in a variety of ways, such as for example, to actuate the closing of an electrically powered gate or the like which will shut off the flow of one material and to actuate the opening of a similar gate to begin the flow of another material into the weighing hopper.

In operation, power is applied to all control circuits. Normally, the output of transducer 22, $Ew$ is zero, since no material has been added to the scale. Since, however, in many instances transducer 22 may have an output due to, for example, residual material on the scale from preceding operations, switch 32 is closed to ground capacitor 29. Capacitor 29 is then charged to a voltage value $Em$, which may be called a memory signal, equal to the transducer output voltage $Ew$ at that given instant.

When switch 32 is open, the voltage $Et$ appearing at the input of amplifier 30 will be zero, since at this moment, $Ew$ minus $Em$ equals zero.

It should be readily understood that in the above described manner, a zero based transducer output may be selectively obtained to result in a zero input voltage to amplifier 30. Further, until switch 32 is closed again, the voltage signal $Et$ appearing at the input to amplifier 30 is equal to the transducer output at any given moment minus the voltage charge stored in capacitor 29.

Before the first material is delivered, the programming device is actuated to introduce a predetermined set point voltage $Es_1$, into the second input of comparator 48.

As the first material enters the weighing hopper and the scale 20 registers the increasing weight of the material, transducer 22 produces a proportionally increasing output voltage, $Ew_1$. Assuming that $Em$ at this moment equals zero, $Et_1$ equals $Ew_1$, and is introduced into the first input of comparator 48, assuming for simplicity that amplifier 30 has a gain of one.

When the weight of the first material being added to the hopper reaches the desired set point value, $Es_1$ will equal signal $Et_1$ and the control signal $Ec$ will be developed to, for example, actuate the stoppage of the flow of the first material.

At this point, relay 36 automatically actuates the closing of switch 32 to again ground capacitor 29. Transducer 22 is now yielding an output signal $Ew_2$ equal to a value representing the weight of the actually delivered first material and capacitor 29 is charged with a new memory signal, $Em_2$ which is, of course, equal to the signal $Ew_2$. When switch 32 is opened, the voltage $Et_2$ at the input of amplifier 30 and at the first input of comparator 48 is again equal to zero, since $Ew_2$ equals $Em_2$.

It should be readily apparent from the description, that at the time of the beginning of the delivery of each material, the voltage $Et$ will always have a zero value. This permits the set point signal, $Es$, to have a value which represents only the desired weight of the next material to be added.

It should be readily apparent from the description, steps may be repeated for any number of additional materials required in the batch and that any deviations in the weight of the actually delivered materials that are reflected in the output signal from transducer 22 are automatically removed so as not to be a cause for error in the any subsequently delivered materials.

It should also be readily seen from the foregoing description that very substantial improvement in the accuracy of the batching ratio may be accomplished by the use of the present invention as compared to the accuracy possible using prior control apparatus and that this improvement in accuracy is possible in a relatively simple and inexpensive manner.

Further, it should be pointed out that a wide range of industrial applications are possible without departing from the spirit of the present invention with only relatively minor adaptations of the principles disclosed herein. For example, controlled delivery of a given amount of a single substance into a plurality of separate containers which must be separately tared before delivery may be accomplished in a much quicker manner utilizing control apparatus falling within the spirit of the present invention.

While the form of embodiment of the present invention as herein disclosed constitutes a preferred form, it is to be understood that other forms might be adopted, all coming within the scope of the claims which follow.

I claim:

1. In a control apparatus for automated industrial processes the combination of a measuring means; transducing means operatively connected to said measuring means for producing an electrical output signal proportional to the measured process parameter; a capacitor communicating with the transducer output for selectively storing an electrical charge proportional to said output signal and being of opposite polarity with respect thereto; a buffer element having a high input impedance and operatively connected to said capacitor to sustain the charge across said capacitor without appreciably loading said capacitor, whereby the signal appearing at the buffer element is equal to the transducer output signal minus the predetermined electrical charge stored in the capacitor.

2. In a control apparatus for automatic weighing operations the combination of a weighing scale; transducing means operatively connected to said scale for producing an output signal proportional to the weight indicated by said scale; a capacitor operatively connected to said transducer for storing a charge of opposite polarity but proportional to said output signal of said transducer; switch means operatively connected to said capacitor and to ground for selectively charging said capacitor proportional to the output signal from said transducer; a buffer element provided with an input having a high impedance quality communicating with said capacitor for permitting the measurement of the algebraic sum of the transducer output signal and the charge stored in said capacitor; and means for comparing the output signal from said buffer element with a predetermined signal and for producing a control signal responsive to a given ratio between the signals being compared.

3. An apparatus for controlling an automatic multi-ingredient weigh batching operation comprising, in combination, weighing means; transducing means operatively connected to said weighing means for producing an electrical output signal proportional to the weight measured by said weighing means; a capacitor communicating with said transducer output signal for storing a charge of opposite polarity but equal to any given transducer output signal; and an operational amplifier connected to said capacitor for permitting the measurement of the algebraic sum of the output signal from said transducer and the charge stored in said capacitor without loading said capacitor; switch means operatively connected to said capacitor for permitting said capacitor to be selectively charged to a value equal to any given transducer output signal; means for producing a predetermined set point signal proportional to the weight measured by said weighing means; and a comparator element operatively connected to said operational amplifier and to said last mentioned means for producing a control signal when the signal leaving said capacitor output and said predetermined set point signal reach a given ratio.

References Cited

UNITED STATES PATENTS

| | | | |
|---|---|---|---|
| 1,407,078 | 2/1922 | Murray | 177—137 |
| 2,882,035 | 4/1959 | Lauler et al. | 177—164 XR |
| 2,933,281 | 4/1960 | Hyde et al. | 177—121 |
| 2,938,701 | 5/1960 | Thorsson et al. | 177—211 XR |
| 3,000,101 | 9/1961 | Giardino et al. | 177—210 XR |
| 3,066,752 | 12/1962 | Spademan | 177—211 |
| 3,137,357 | 6/1964 | Brenner. | |
| 3,434,343 | 3/1969 | Senour | 177—211 XR |
| 3,464,508 | 9/1969 | Engle et al. | 177—164 |

ROBERT S. WARD, JR., Primary Examiner

U.S. Cl. X.R.

177—70, 210